United States Patent
Chen et al.

(10) Patent No.: US 12,299,763 B2
(45) Date of Patent: May 13, 2025

(54) DATA LOADING METHOD AND CAPSULE ENDOSCOPE IMAGE COLLECTION SYSTEM THEREOF

(71) Applicant: ANKON TECHNOLOGIES CO., LTD, Wuhan (CN)

(72) Inventors: Junjie Chen, Wuhan (CN); Pan Zhou, Wuhan (CN)

(73) Assignees: ANKON TECHNOLOGIES CO., LTD, Wuhan (CN); ANX IP HOLDING PTE. LTD., Singapore (SG)

( * ) Notice: Subject to any disclaimer, the term of this patent is extended or adjusted under 35 U.S.C. 154(b) by 161 days.

(21) Appl. No.: 18/009,313

(22) PCT Filed: Jun. 4, 2021

(86) PCT No.: PCT/CN2021/098292
§ 371 (c)(1),
(2) Date: Dec. 8, 2022

(87) PCT Pub. No.: WO2021/249294
PCT Pub. Date: Dec. 16, 2021

(65) Prior Publication Data
US 2023/0236733 A1    Jul. 27, 2023

(30) Foreign Application Priority Data
Jun. 8, 2020  (CN) .......................... 202010511692.1

(51) Int. Cl.
*G06T 1/00*       (2006.01)
(52) U.S. Cl.
CPC .................. *G06T 1/0007* (2013.01)

(58) Field of Classification Search
CPC ......... G06T 1/0007; G06T 1/60; G16H 30/20; G16H 40/40; A61B 1/00009
See application file for complete search history.

(56) References Cited

U.S. PATENT DOCUMENTS

| 5,832,307 A * | 11/1998 | Crary ................. H04B 7/18539 |
| | | 710/52 |
| 2015/0381280 A1 | 12/2015 | Shirai et al. |
| 2017/0249002 A1* | 8/2017 | Costa .................... G06F 21/575 |

FOREIGN PATENT DOCUMENTS

| CN | 110710177 A | 1/2010 |
| CN | 103690138 A | 4/2014 |

(Continued)

OTHER PUBLICATIONS

Chen_CN105959140_English—EPO (Year: 2016).*
Tong_CN108062235_English—EPO (Year: 2018).*

*Primary Examiner* — Sing-Wai Wu
(74) *Attorney, Agent, or Firm* — Treasure IP Group, LLC

(57) ABSTRACT

The present invention provides a data loading method. The method comprises: reading data from an initial address in a memory; obtaining a frame header identifier, loading a valid data segment comprising the frame header identifier; verifying the valid data segment; when it is determined that the verification is successful, sending at least part of information within the valid data segment to a cache unit; updating a register according to at least part of the information by the cache unit. Using a specific frame header identifier, loading data in the memory starts only from the specific frame header identifier, which skips the data before the frame header identifier and avoids loading invalid data in the cache unit, thus saving time, preventing lengthy program, and being more scientific and convenient.

16 Claims, 2 Drawing Sheets

(56) References Cited

FOREIGN PATENT DOCUMENTS

| CN | 105959140 A | 9/2016 |
| CN | 108062235 A | 5/2018 |

* cited by examiner

US 12,299,763 B2

DATA LOADING METHOD AND CAPSULE ENDOSCOPE IMAGE COLLECTION SYSTEM THEREOF

CROSS-REFERENCE OF RELATED APPLICATIONS

The application is a National Phase Application of PCT International Application No. PCT/CN2021/098292, filed on Jun. 4, 2021, which further claims priority from Chinese Patent Application No. 202010511692.1, filed Jun. 8, 2020, entitled "data loading method and capsule endoscope image collection system thereof", all of which are incorporated herein by reference in their entireties.

FIELD OF INVENTION

The present invention relates to a capsule endoscope technique, and more particularly to a data loading method and a capsule endoscope image collection system thereof.

BACKGROUND

In a capsule endoscope image collection and processing system, an image processing integrated circuit, especially an application specific integrated circuit (ASIC), is responsible for receiving images captured by an image sensor, and pre-processing and compressing the images before transmitting them to a wireless chip, which then wireless chip transmits the images to a receiving device.

Among them, the image processing integrated circuit, as the core of the whole image collection and processing system, has to be forward compatible with different models of image sensors as well as backward compatible with different wireless chips, and also needs internal units of the wireless chips to switch over between different operating modes. Therefore, the image processing integrated circuit needs to have a corresponding storage medium inside to store configuration parameters. When the wireless chip is started, internal registers of the wireless chip are configured through the configuration parameters to determine working modes of the wireless chip and compatibility modes to outside of the wireless chip.

However, a non-volatile memory utilized in the prior art is widely used in chip design because of its low power consumption and small footprint. It provides a guarantee for a successful tape-out of image processing chips with low power consumption and small packages. In specific applications of the image processing chips, in order to serve different products and different scenarios, it is often necessary to modify internal startup parameters of the image processing chip in small batches and multiple times.

Therefore, it is necessary to design a new data loading method and a capsule endoscope image collection system thereof.

SUMMARY OF THE INVENTION

According to one aspect of the present invention, a data loading method is disclosed, the method comprises: reading data from an initial address in a memory; obtaining a frame header identifier, loading a valid data segment comprising the frame header identifier from the data; verifying the valid data segment; sending at least part of information within the valid data segment to a cache unit when it is determined that the verification is successful; and updating a register according to at least part of the information by the cache unit.

In one embodiment, the step "loading a valid data segment comprising the frame header identifier" comprises: loading the frame header identifier, address information, length information, data information and verification information in sequence.

In one embodiment, the step "verifying the valid data segment" comprises: presetting a verification algorithm; calculating the valid data segment in accordance with the verification algorithm and deriving a verification value for the valid data segment; comparing the verification value with the verification information; determining that the verification is successful when the verification value is consistent with the verification information; and determining that the verification is unsuccessful when the verification value is inconsistent with the verification information.

In one embodiment, the step "sending at least part of information within the valid data segment to a cache unit" specifically comprises: sending the address information and the data information within the valid data segment to the cache unit.

In one embodiment, after the step "sending the address information and the data information within the valid data segment to the cache unit" comprises: when a received new valid data segment in which new address information is the same as the original address information of the valid data segment but new data information is different from the original data information of the valid data segment, overwriting the original data information with the new data information.

In one embodiment, the step "verifying the valid data segment" further comprises: discarding the valid data segment when it is determined that the verification is unsuccessful.

In one embodiment, in the step "reading data from an initial address in a memory", when the frame header identifier is not read at the initial address, reading data in the memory is continued until storage space of the entire memory is traversed.

In one embodiment, in the step "reading data from an initial address in a memory", when the frame header identifier is not read at the initial address, reading data in the memory is stopped.

According to another aspect of the present invention, a capsule endoscope image collection system that can work according to the data loading method set forth is disclosed, comprising: a chip and an integrated circuit. The chip comprises a register internally. The integrated circuit comprises a memory, a load unit that loads the valid data segment from the memory, a cache unit that caches at least part of the information in the valid data segment, and a register update unit that can update the register based on at least part of the information.

In another embodiment, the memory is an eFUSE memory.

Compared to the prior art, the present invention provides a data loading method and a capsule endoscope image collection system thereof, which uses a specific frame header identifier to load data from the specific frame header identifier when the memory loads data, so as to send at least part of the information of the valid data segment comprising the frame header identifier to the cache unit for subsequent register updating. In this way, it is unnecessary to modify startup parameters in small batches for many times. It can avoid invalid data loading in the cache unit, save time, and prevent lengthy programs, and can better adapt to different working modes and compatibility modes.

DETAILED DESCRIPTION

In order to enable those in the art to better understand technical solutions in the present invention, the technical solutions in the embodiments of the present invention will be clearly and completely described below in conjunction with accompanying drawings in the embodiments of the present invention. It is clear that the embodiments described are only a part of the embodiments of the present invention, and the present invention is capable of other embodiments or of being practiced or carried out in various ways. Based on the embodiments in the present invention, all other embodiments obtained by a person of ordinary skill in the art without making creative labor shall fall within the scope of protection of the present invention.

Figure 1:
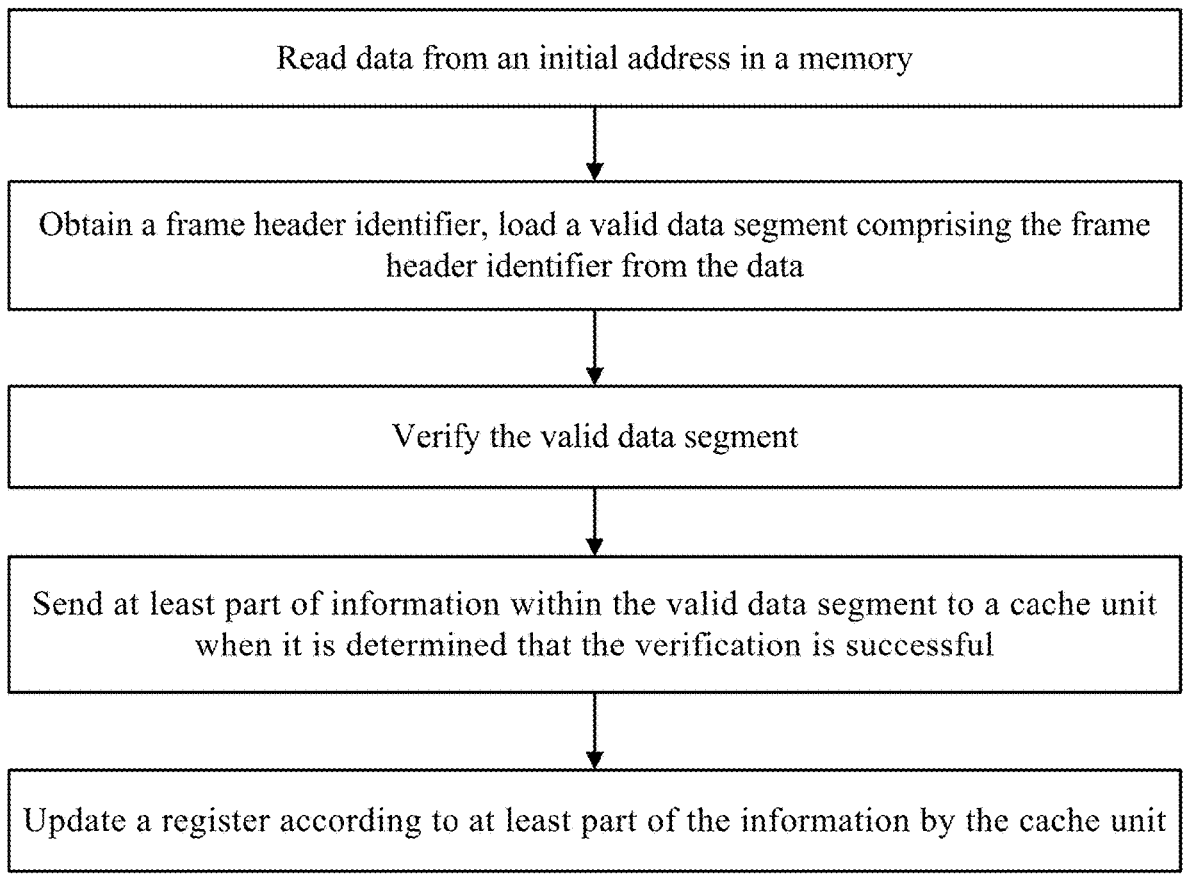
FIG. 1 shows a process flow diagram of a data loading method in accordance with embodiments of the present invention.
Figure 2:
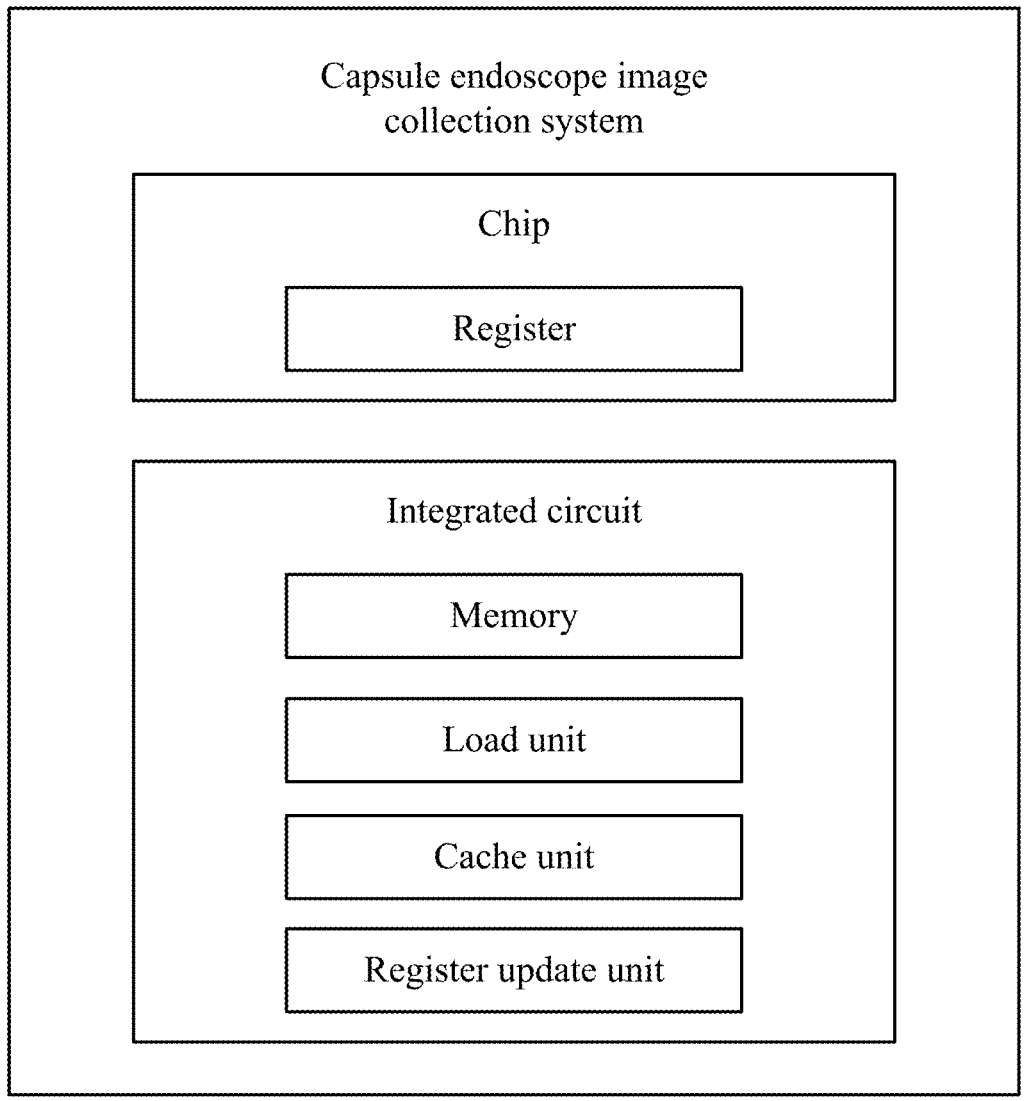

Referring to FIG. 1, the present invention discloses a data loading method, the method comprises:
  reading data from an initial address in a memory;
  obtaining a frame header identifier, loading a valid data segment comprising the frame header identifier from the data;
  verifying the valid data segment;
  when it is determined that the verification is successful, sending at least part of information within the valid data segment to a cache unit; and
  updating a register according to at least part of the information by the cache unit.

Therefore, in the present invention, using a specific frame header identifier, loading data in the memory can start only from the specific frame header identifier, which skips data before the frame header identifier and avoids loading invalid data in the cache unit, thus saving time, preventing lengthy program, and being more scientific and convenient. The data loaded from the specific frame header identification is the valid data segment, and at least part of the information of the valid data segment successfully verified is sent to the cache unit. Furthermore, the cache unit updates the register according to the at least part of the information, which means that once the cache unit sends update information to the register, the register can be modified, so as to adapt to different working modes and compatibility modes.

The step "loading a valid data segment comprising the frame header identifier" comprises:
  loading the frame header identifier, address information, length information, data information and verification information in sequence.

That is, a data format of the valid data segment is the frame header identifier, the address information, the length information, the data information and the verification information in order. The frame header identifier is a set of fixed data and is the start of the valid data segment. The address information indicates an address in a target register used for updating the data information. The length information indicates the valid length of the data information. The verification information is verification data of the valid data segment.

Since the data loading method as described above is applied to a capsule endoscope image collection system, and the image collection system comprises an integrated circuit, the data loading method is applied to the integrated circuit. The integrated circuit comprises a data protocol for developing the data format for storing the valid data segment in the memory.

Further, the step "verifying the valid data segment" comprises:
  presetting a verification algorithm;
  calculating the valid data segment in accordance with the verification algorithm and deriving a verification value for the valid data segment;
  comparing the verification value with the verification information;
  when the verification value is consistent with the verification information, determining that the verification is successful; and
  when the verification value is inconsistent with the verification information, determining that the verification is unsuccessful.

In the present invention, after the valid data segment is loaded, the valid data segment is calculated according to the preset verification algorithm and the verification value is derived. Comparing the calculated verification value with the loaded verification information, the data security can be improved. For one thing, the image collection system can be prevented from being in an invalid working mode due to the error programming of information in the valid data segment; for another, the information within the valid data segment can be prevented from being corrupted. Thus, the filtering of information can be achieved.

Thus, the step "sending at least part of information within the valid data segment to a cache unit" specifically comprises:
  sending the address information and the data information within the valid data segment to the cache unit.

Verify according to the above steps. If the verification is unsuccessful, it means that the valid data segment is applicable to the target register. As previously mentioned, the address information represents the address in the target register used to update the data information in the corresponding valid data segment. Therefore, for valid data segments that are successfully verified, only the address information and the data information within the valid data segment need to be extracted and sent to the cache unit. Therefore, the cache unit only needs to cache the address information and the data information, which can update the data information to the corresponding address in the target register when updating the target register.

In addition, the cache unit does not update the register immediately after obtaining the address information and the data information, but waits until all the data in the memory is traversed and all valid data segments are verified before updating.

As a result, there may be multiple sets of data with the same address in the cache unit. Specifically, after the step "sending the address information and the data information within the valid data segment to the cache unit" comprises: when the cache unit receives a new valid data segment in which new address information is the same as the original address information of the valid data segment but new data information is different from the original data information of the valid data segment, overwriting the original data information with the new data information. That is, in the cache unit, if it appears that the address information in two sets of data is the consistent but the data information is inconsistent, the original data information is overwritten with the new data information to ensure that the data information is updated in real time. Since, as described above, the address information refers to the address of the target register, the data information corresponding to the address information can change the different working modes and compatibility modes of the target register, so that the different working modes and compatibility modes of the target register can also be updated in real time.

In addition to the subsequent steps described above when determining the success of the valid data segment verification, the data loading method further comprises processing data after the unsuccessful verification. The step "verifying the valid data segment" further comprises: when it is determined that the verification is unsuccessful, discarding the valid data segment. That is, compared with the above steps, if it is determined that the verification is unsuccessful, the valid data segment is not be sent to the cache unit, but is discarded directly. Thus, the purpose of filtering data is achieved and the security of the whole system is improved.

In addition, the integrated circuit of the present invention further comprises a load unit. The load unit can read the data in the memory from an initial position in the memory after the integrated circuit is powered up as a whole. As described above, if the frame header identifier is read during the loading of reading, the valid data segment is further loaded and verified. If the frame header identifier is not read, how to proceed with subsequent data loading, two embodiments are adopted in the present invention.

In one aspect, in the step "reading data from an initial address in a memory", when the frame header identifier is not read at the initial address, reading data in the memory is continued until storage space of the entire memory is traversed. In this embodiment, if the frame header identifier is not read at the initial address, the reading downward continues.

In another aspect, in the step "reading data from an initial address in a memory", when the frame header identifier is not read at the initial address, reading data in the memory is stopped. In this embodiment, if the frame header identifier is not read at the initial address, it indicates that the data stored in this memory is incorrect, and the load unit stops loading the data in the memory.

Both of the above embodiments can achieve the objects of the present invention. In practical application, the choice of these two embodiments depends on the actual data protocol.

The present invention further provides a capsule endoscope image collection system that can work according to the data loading method. Corresponding to the data loading method described above, the capsule endoscope image collection system comprises a chip and an integrated circuit. The chip comprises a register internally. The integrated circuit comprises a memory, a load unit that loads the valid data segment from the memory, a cache unit that caches at least part of the information in the valid data segment, and a register update unit that can update the register based on at least part of the information. Those skilled in the art know that, the chip is the integrated circuit.

Therefore, through the above arrangements, the integrated circuit after power up can obtain different data information from the memory according to the requirement to configure the register, so that the chip has different working modes and compatibility modes to the outside. Also, in the present invention, the data of all working modes and compatibility modes of the chip can be obtained from the memory of the integrated circuit, so that the purpose of multiple configurations can be achieved and the register in the chip can be updated multiple times.

In addition, the memory used in the present invention is an eFUSE memory.

The eFUSE memory is characterized by high integration and low power consumption. The eFUSE memory is a one-time programmable memory, which cannot be rewritten. Each bit in eFUSE memory can only be programmed from 0 to 1, but cannot be restored from 1 to 0. But the data is in byte, and a bit with the value of 0 in correct data Byte can be programmed to 1 by secondary programming, so that the data is destroyed to achieve the purpose of filtering data segments. For example, assuming that the frame header is 5A, the frame header can be reprogrammed to FF, which destroys the frame header information, and the subsequent loading process can skip the data segment. Therefore, in the present invention, all the working modes and compatibility modes or other related data required by the chip are stored in the eFUSE memory, and when necessary, the load unit loads the data in the eFUSE memory, confirms and checks the corresponding data through the frame header identifier, and stores in the cache unit. The cache unit can first cache the data information and update the data information with the same address information. After final loading to the memory is completed, the register update unit updates the register according to the data finally stored in the cache unit. Moreover, the register update unit can modify the register multiple times according to the principle that new data overwrites old data.

Therefore, the storage space of the eFUSE memory is fully utilized in the present invention, and in combination with the register update unit, the purpose of configuring registers multiple times is achieved by sacrificing the storage space of the eFUSE memory to adapt to different working modes and compatibility modes.

To sum up, in the present invention, using a specific frame header identifier, loading data in the memory can start only from the specific frame header identifier, which skips the data before the frame header identifier and avoids loading invalid data in the cache unit, thus saving time, preventing lengthy program, and being more scientific and convenient. At least part of the information of the valid data segment successfully verified is sent to the cache unit, and then the cache unit updates the register according to the at least part of the information, which means that once the cache unit sends update information to the register, the register can be modified, so as to adapt to different working modes and compatibility modes.

Furthermore, it should be understood that although the specification is described according to embodiments, not each embodiment contains only one separate technical solution, and that the specification is described in this manner only for clarity, and that those skilled in the art should consider the specification as a whole, and that the technical solutions in each embodiment may be suitably combined to form other embodiments as may be understood by those skilled in the art.

The series of detailed descriptions listed above are only specific to the feasible embodiments of the present invention and are not intended to limit the scope of protection of the present invention, and any equivalent embodiments or changes made without departing from the spirit of the art of the present invention shall be included in the scope of protection of the present invention.

The invention claimed is:
1. A data loading method, comprises:
reading data from an initial address in a memory;

obtaining a frame header identifier, loading a valid data segment comprising the frame header identifier from the data;

verifying the valid data segment;

sending at least part of information within the valid data segment to a cache unit when it is determined that the verification is successful;

updating a register according to at least part of the information by the cache unit, wherein the register update occurs conditional upon successful verification of the valid data segment; the cache unit temporarily stores segmented data segments, and the register is updated with the latest data based on successful verification of each segment; and destroying the frame header in real time, by secondary programming a bit with a value of 0 to 1 in correct data of the memory comprising the frame header identification and invalidating the frame for further processing; wherein the memory is an eFUSE memory.

2. The method of claim 1, wherein the step "loading a valid data segment comprising the frame header identifier" comprises:

loading the frame header identifier, address information, length information, data information and verification information in sequence.

3. The method of claim 2, wherein the step "verifying the valid data segment" comprises:

presetting a verification algorithm;

calculating the valid data segment in accordance with the verification algorithm and deriving a verification value for the valid data segment;

comparing the verification value with the verification information;

determining that the verification is successful when the verification value is consistent with the verification information; and determining that the verification is unsuccessful when the verification value is inconsistent with the verification information.

4. The method of claim 2, wherein the step "sending at least part of information within the valid data segment to a cache unit" specifically comprises:

sending the address information and the data information within the valid data segment to the cache unit.

5. The method of claim 4, wherein after the step "sending the address information and the data information within the valid data segment to the cache unit" comprises: when a received new valid data segment in which new address information is the same as the original address information of the valid data segment but new data information is different from the original data information n of the valid data segment, overwriting the original data information with the new data information.

6. The method of claim 1, wherein the step "verifying the valid data segment" further comprises:

discarding the valid data segment when it is determined that the verification is unsuccessful.

7. The method of claim 1, wherein in the step "reading data from an initial address in a memory", when the frame header identifier is not read at the initial address, reading data in the memory is continued until storage space of the entire memory is traversed.

8. The method of claim 1, wherein in the step "reading data from an initial address in a memory", when the frame header identifier is not read at the initial address, reading data in the memory is stopped.

9. A capsule endoscope image collection system, comprising: a chip and an integrated circuit, wherein the chip comprises a register internally; the integrated circuit comprises a memory, a load unit that loads a valid data segment from the memory, a cache unit that caches at least part of information in the valid data segment, and a register update unit that updates a register based on at least part of the information;

the chip configured to:

read data from an initial address in the memory;

obtain a frame header identifier, load the valid data segment comprising the frame header identifier from the data by the load unit;

verify the valid data segment;

send at least part of the information within the valid data segment to the cache unit when it is determined that the verification is successful;

updating a register according to at least part of the information by the register unit, wherein the register update occurs conditional upon successful verification of the valid data segment; the cache unit temporarily stores segmented data segments, and the register is updated with the latest data based on successful verification of each segment; and destroying the frame header in real time, by secondary programming a bit with a value of 0 to 1 in correct data of the memory comprising the frame header identification and invalidating the frame for further processing; wherein the memory is an eFUSE memory.

10. The system of claim 9, wherein the valid data segment comprising the frame header identifier is loaded by the chip being configured to:

load the frame header identifier, address information, length information, data information and verification information in sequence.

11. The system of claim 10, wherein the valid data segment is verified by the chip being configured to:

preset a verification algorithm;

calculate the valid data segment in accordance with the verification algorithm and derive a verification value for the valid data segment;

compare the verification value with the verification information;

determine that the verification is successful when the verification value is consistent with the verification information; and determine that the verification is unsuccessful when the verification value is inconsistent with the verification information.

12. The system of claim 10, wherein at least part of the information within the valid data segment is sent to the cache unit by the chip being configured to:

send the address information and the data information within the valid data segment to the cache unit.

13. The system of claim 12, wherein after the address information and the data information within the valid data segment is sent to the cache unit by the chip being configured to: when a received new valid data segment in which new address information is the same as the original address information of the valid data segment but new data information is different from the original data information n of the valid data segment, overwrite the original data information with the new data information.

14. The system of claim 9, wherein the valid data segment is verified by the chip being configured to:

discard the valid data segment when it is determined that the verification is unsuccessful.

15. The system of claim 9, wherein the data from the initial address is read in the memory by the chip being configured to: when the frame header identifier is not read at the initial address, continue reading data in the memory until storage space of the entire memory is traversed.

16. The system of claim 9, wherein the data from the initial address is read in the memory by the chip being configured to: when the frame header identifier is not read at the initial address, stop reading data in the memory.

\* \* \* \* \*